(No Model.)
R. FULLER.
DYNAMO ELECTRIC MACHINE.
No. 534,038. Patented Feb. 12, 1895.
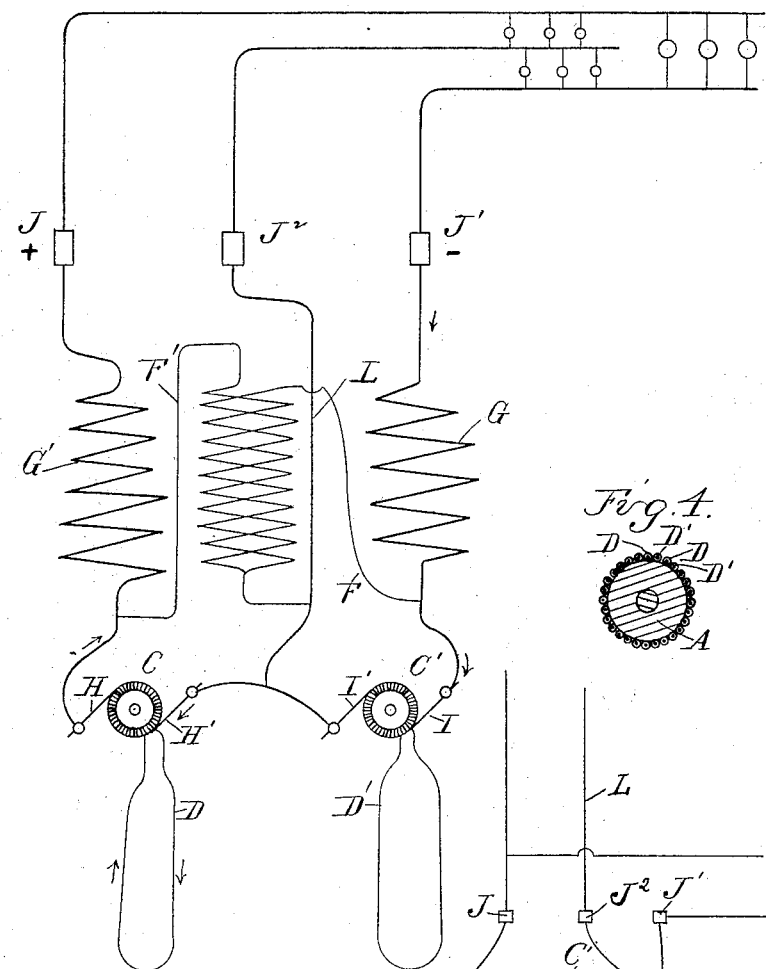
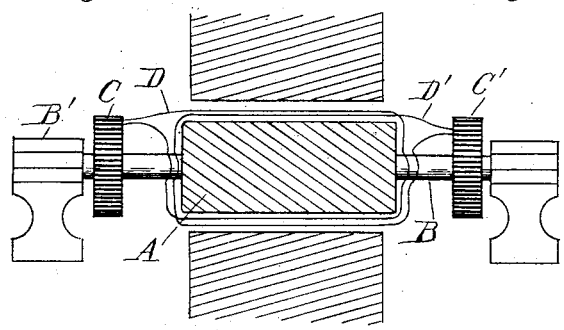
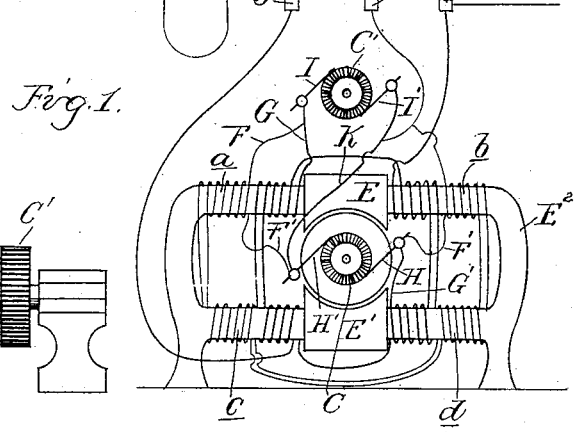
Witnesses
Inventor
Rodolphus Fuller

UNITED STATES PATENT OFFICE.

RODOLPHUS FULLER, OF DETROIT, MICHIGAN.

DYNAMO-ELECTRIC MACHINE.

SPECIFICATION forming part of Letters Patent No. 534,038, dated February 12, 1895.

Application filed October 20, 1894. Serial No. 526,475. (No model.)

*To all whom it may concern:*

Be it known that I, RODOLPHUS FULLER, a citizen of the United States, residing at Detroit, in the county of Wayne and State of Michigan, have invented certain new and useful Improvements in Dynamo-Electric Machines, of which the following is a specification, reference being had therein to the accompanying drawings.

The invention relates to new and useful improvements in dynamo electric machines especially designed for producing two voltages from the same machine. In the present state of the art this is accomplished by the three wire system, the establishing of which requires the use of two dynamos.

The object of my invention is to accomplish like results from a single machine, the peculiar construction of which is fully hereinafter described.

In the drawings, Figure 1 is a diagram elevation of the dynamo showing the winding of the field magnets and their connections with the brushes of the two commutators. Fig. 2 is a diagram longitudinal section through the armature showing two Siemens windings and their respective connections with the two commutators. Fig. 3 is a diagram plan view illustrating the arrangement of the field and shunt coils to produce a three wire system of distribution. Fig. 4 is a cross section of the armature showing a single layer of windings.

A is an armature; B, its shaft journaled in suitable bearings B' in the frame of the dynamo which carries the two commutators C and C' secured to it in the ordinary manner.

D represents a straight Siemens winding of a single turn of wire, about the armature connected to the commutator C. D' is a similar coil of wire wound in the same manner and adjacent to the coil D and is connected to the commutator C'. This style of winding produces an armature having a single layer of wire composed of a number of separate turns which are connected in alternate order to the commutators C C', as plainly shown in Figs. 2 and 4.

The field magnets of the dynamo are shown of a type similar to those in a Weston or Crompton machine in which the magnet cores $ab$ and $cd$ are cast integral with their respective pole-pieces E, E' and are secured to and held in position by the end pieces $E^2$. The fields are compound wound with shunt and series coils in such a manner as to produce voltages preferably of one hundred and ten and two hundred and twenty volts, these being the voltages most frequently required in practical use. Two pairs of series and shunt coils are employed in my device, the windings of which are as follows: One of the series coils G is wound upon a portion of each of the four field magnet cores, one end being connected to the brush I of the commutator C', while the other is connected through the binding post J' to one of the leads. A shunt coil F is wound in a manner similar to the series winding, the ends of which are connected to the brushes I and I', the windings of the series and shunt coils being of the proper number of turns to produce a voltage of one hundred and ten volts. In the same manner the second pair of series and shunt coils are placed upon the field magnet cores of the dynamo, the shunt F' being connected to the brushes H H', while the series is connected, one end to the brush H and the other through the binding post J to the lead.

In building my dynamo, I preferably wind the two wires, which form the series windings, upon the field magnet cores at the same time, making the proper connections as before stated. The two shunt coils I wind in a similar manner.

It will now be seen from this style of winding that by connecting the brushes H' I' by a connecting bar or wire K, the two sets of windings will be put in series with each other producing a voltage of two hundred and twenty volts.

To the strip or bar K is connected the neutral wire L which passing through the binding post $J^2$ completes my three wire system from a single machine.

This style of dynamo is peculiarly adapted to be used in private plants or in locations where access to an ordinary Edison current is impossible and where current is required both for the purpose of lighting and for other devices, such as motors, &c.

The use of my improved machine not only decreases the floor space of the plant but does away with the care and keeping in order of an extra dynamo. It also forms a factor of considerable importance in the cost of installation, as the expense of the extra windings and material in my improved device is but slight in comparison with the cost of another dynamo, and the extra belting, bearings, pulleys, &c., required for the same.

What I claim as my invention is—

1. The combination in a dynamo electric machine, of the armature shaft, two commutators thereon, double windings on the armature connected respectively to the two commutators, shunt and series windings on the field magnets, a strip connecting the series windings in series, and a neutral wire connected to the strip, substantially as and for the purpose described.

2. The combination in a dynamo electric machine, of the armature shaft, two commutators thereon on opposite ends, and double windings upon the armature comprising a number of separate turns of wire connected to the two commutators in alternate order, substantially as described.

3. The combination in a dynamo electric machine, of the armature shaft, two commutators C C' on opposite ends of said shaft, two sets of brushes I I' and H H', the binding posts J J', and two sets of field windings comprising a series and shunt winding in each set, the terminals of the shunt windings being connected respectively to the brushes I I' and H H', and the series windings to a brush and a lead substantially as and for the purpose described.

In testimony whereof I affix my signature in presence of two witnessess.

RODOLPHUS FULLER.

Witnesses:
M. B. O'DOGHERTY,
L. J. WHITTEMORE.